May 31, 1932.  R. HEDGE  1,860,577
SPIT
Filed Sept. 12, 1928   2 Sheets-Sheet 1

INVENTOR.
Roy Hedge
BY
ATTORNEY.

May 31, 1932.  R. HEDGE  1,860,577
SPIT
Filed Sept. 12, 1928   2 Sheets-Sheet 2
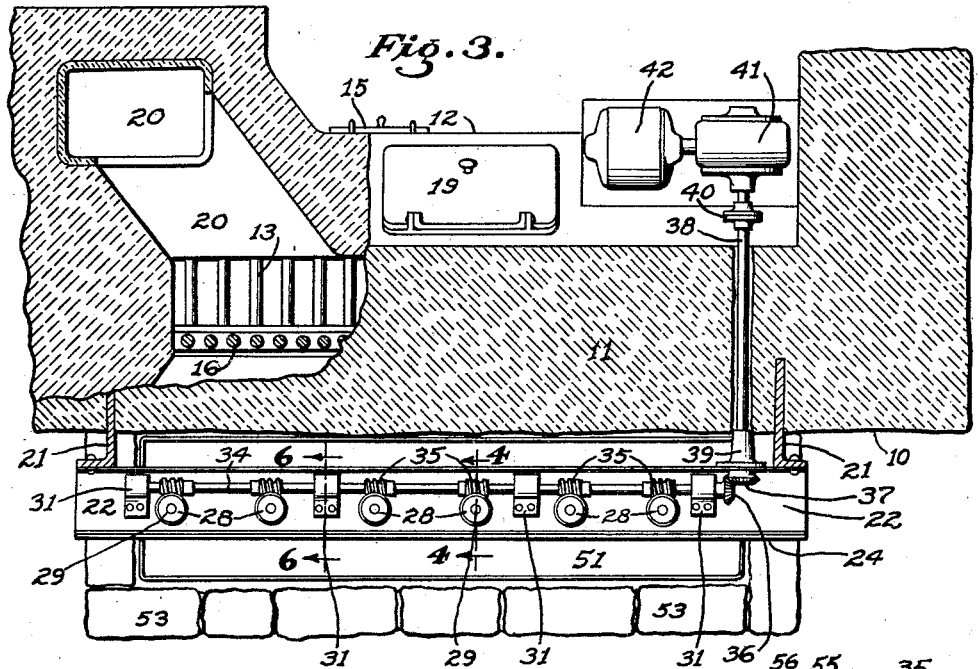
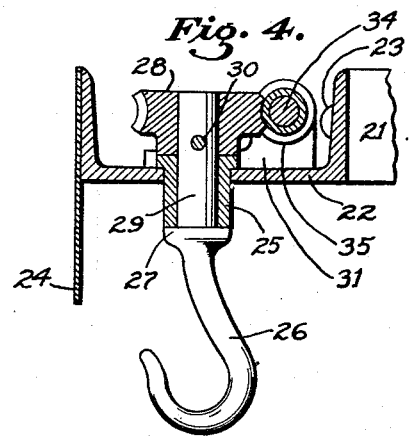
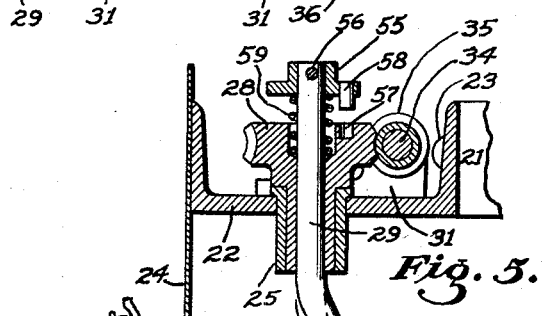
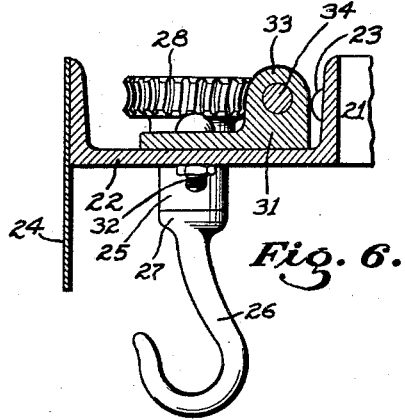
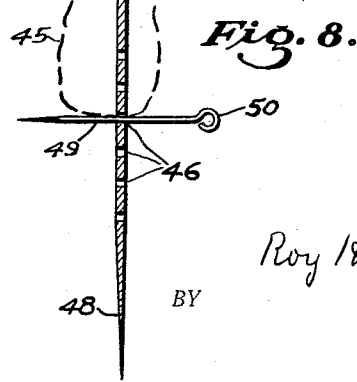
INVENTOR.
Roy Hedge
BY
ATTORNEY.

Patented May 31, 1932

1,860,577

UNITED STATES PATENT OFFICE

ROY HEDGE, OF PLEASANT RIDGE, MICHIGAN

SPIT

Application filed September 12, 1928. Serial No. 305,590.

The object of my invention is to provide a spit of simple, durable and inexpensive construction.

Still a further object of my invention is to provide a spit especially adapted for use in connection with barbecue stands such as stud the highways of this country.

Still a further object of my invention is to provide such a spit as may be used to roast a number of pieces of meat at the same time and which is so arranged that the various pieces can be placed on the spit and removed independently of each other.

Still a further object of my invention is to provide an improved operating means for rotating the spears upon which the pieces of meat are impaled, and to provide means for rotating a plurality of these spears simultaneously.

Still a further object of my invention is to provide a spit with a plurality of rotating hooks whereby a plurality of spears may be hooked thereon to suspend the rotating pieces of meat before the fire.

Still a further object of my invention is to provide means whereby certain of these hooks may be held from rotation when the meat is being placed thereon or removed therefrom so as to make it unnecessary to stop the remaining hooks when a particularly heavy piece of meat is being placed before the fire.

With these and other objects in view my invention consists in the arrangement, construction, and combination of the various parts of my improved device as described in the specification, claimed in the claims and illustrated in the accompanying drawings in which:

Figure 3 shows a top or plan view of the operating device for the hooks upon which the spears are hung, parts of the fireplace being shown in section to better illustrate its construction.

Figure 4 shows an enlarged detailed sectional view taken on the line 4—4 of Figure 3.

Figure 5 shows a similar view of an alternate form of my improved device.

Figure 6 shows a section taken on the line 6—6 of Figure 3.

Figure 8 shows a side elevation of my improved spear, parts being shown in central sectional view to better illustrate its construction.

Figure 1:
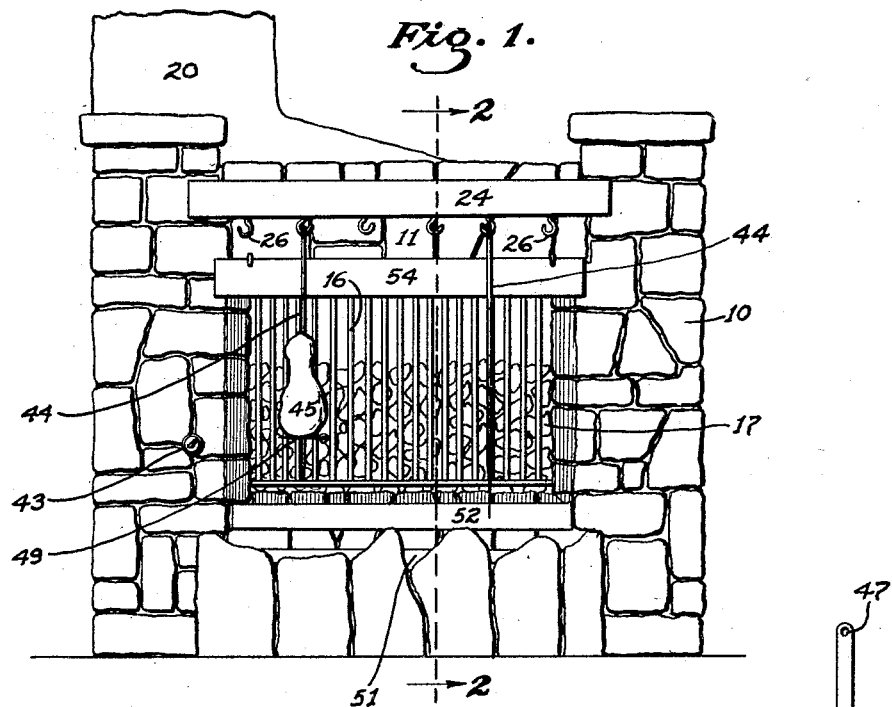
Figure 1 shows a front elevation of my improved spit.

Referring to the accompanying drawings, I have used the reference numeral 10 to indicate generally the front walls of the fireplace on which my improved spit is installed. The lintel 11 extends across the top of the fireplace and a rear wall 12 is disposed at the back thereof. A grate 13 is sunk into the walls 10 and 12 and as ash pit 14 extends down below the grate 13 and laterally so that a cover 15 may be removed to remove the ashes from the fireplace.

A plurality of spaced vertical bars 16 form a grid in front of the fireplace and within the lines of the front wall 10 so that coke or other inflammable material 17 may be piled down in between the rear wall 12 and the grid 16 to furnish the fire for the fireplace. A filling passageway 18 is extended up from the space above the coke 17 and a cover 19 is placed over this filling passageway so that coke may be fed to the fire when desired. A smoke flue 20 extends upwardly and laterally over one side of the fire box to any suitable place to discharge the smoke.

A pair of brackets 21 are sunk into the lintel 11 at either side of the opening for the fireplace and support an upwardly opening channel iron 22 in any suitable way as by means of rivets 23. A skirt 24 is secured to the front of this channel 22 for the purpose of concealing the mechanism therein and giving a more pleasing appearance to the device. The upwardly opening channel forms an effective means for preventing lubricant, which may be used in the device, from running down on the meat being roasted.

A plurality of spaced holes are drilled in the bottom of this channel 22 and bearing sleeves 25 are set into these openings. A plurality of hooks 26 each have a shoulder 27 formed at their upper ends adapted to bear against the bottom of the sleeves. A worm wheel 28 is secured to the top of the shaft section 29 formed at the upper end of the hook 26 by any suitable means as by a pin 30. A plurality of bearing brackets 31 are bolted as at 32 to the bottom of the channel 22 and are provided with ears 33 designed to form a journal for a worm shaft 34. This worm shaft 34 extends practically the entire length of the channel 22 and is provided opposite each worm wheel 28 with a worm 35. One end of the worm shaft has a bevel gear 36 secured thereto in position to co-operate with a second bevel gear 37 which is mounted on the forward end of a drive shaft 38 which extends through an opening in the lintel 11.

A bearing sleeve 39 is secured in any suitable manner to the rear vertical wall of the channel 22 adjacent to the gears 36 and 37 to form a bearing for the forward end of the drive shaft 38. The rear end of the drive shaft 38 is connected by a flexible coupling 40 with a speed reducing gearing 41. This gearing is illustrated herein by merely showing the casing as any standard form of speed reducing gear may be used. This speed reducing gear is operated by an electric motor 42. A control switch 43 is mounted in the front wall 10 of the fireplace and suitably connected with motor 42 so that the latter may be turned on or off by this switch.

From the construction of the parts so far described, it will be seen that the motor 42 will rotate the speed reducing gearing 41 to thereby drive the shaft 38 which in turn drives the worm shaft 34. Rotation of the latter, rotates the worms 35 which drives the worm wheels 28 which rotates the hooks 26 on vertical axes. It will thus be seen that operation of the motor will operate these hooks 26 continuously as long as the motor is running.

Figure 2:
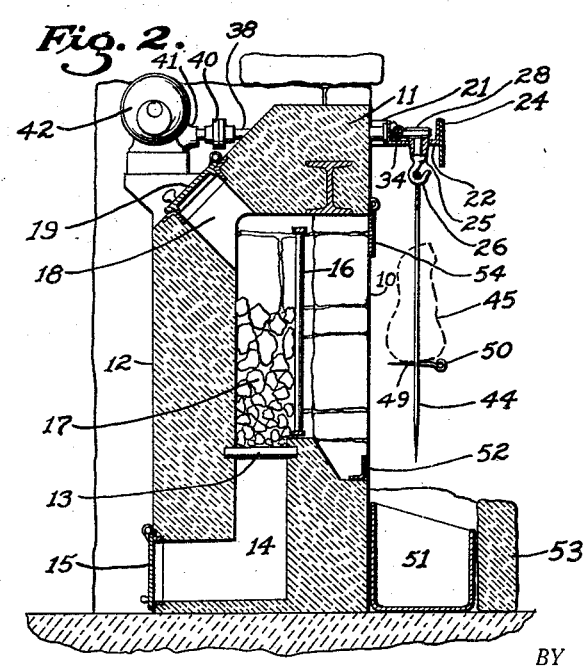
Figure 2 shows a vertical transverse sectional view through the device taken on line 2—2 of Figure 1.
Figure 7:
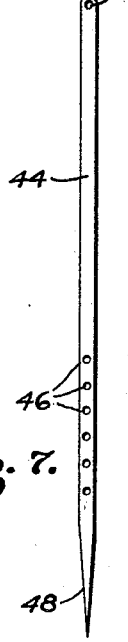
Figure 7 shows an elevation of one of the spears used in connection with my improved spit.

The meat barbecued on spits such as are herein disclosed is ordinarily in the form of shoulders or legs or other large pieces and a spear 44 is driven through the piece of meat as is illustrated at 45 in Figure 1 and 2. These spears are illustrated in detail in Figures 7 and 8 from which it will be noted that they consist of a strip of flat metal having a plurality of holes 46 therethrough. At the upper end an eye 47 is provided which may be hooked over the hooks 26. The lower end is sharpened at 48 to facilitate driving the spear through the meat. A pin 49 having a head 50 is designed to be passed through one of the openings 46 in the spear 44 so that the meat 45 may be pressed down on this pin 49 to hold the latter in place and to hold the meat on the spear 44 at the proper height before the fire. I have also provided the spears with chromium plating to prevent oxidation forming thereon and affecting the meat.

A grease pan 51 is set below the meat 45 so that any grease that is fried off from it may be collected and saved. An angle iron 52 is disposed at the lower edge of the fireplace opening so that any ashes or other material from the fire which falls through the grid 16 may be caught by this angle and be prevented from falling into the grease pan 51.

An ornamental cobble-stone curb 53 is disposed around the base of the fireplace and the grease pan 51 to hide the pan from observation and to give a finished appearance to the fireplace. A hinged skirt 54 is placed at the top of the fireplace opening to prevent smoke from coming out the front of the fireplace.

From the construction of the parts just described, it will be seen that when meat is to be barbecued it may be forced onto one of the spears 33 and then the pin 49 inserted in the proper hole 46 and then the meat may be pushed down against the pin to lock the meat on the spear 44. The spear 44 is then hung by the eye 47 on one of the hooks 26 and allowed to hang there and rotate until it is properly done. The meat is then removed by simply unhooking the spear and withdrawing the pin 49 from the spear and the spear from the meat.

In certain instances it has been found difficult to hang heavy pieces of meat on the hooks when the hooks are rotating and it is not advisable to stop the hooks from rotating as the meat already in front of the fireplace might burn during the stopping period. Means are therefore provided so that one or more of the hooks may be constructed as is illustrated in Figure 5 so that the hook may be held by hand from rotation when the meat is being hung on it but the weight of the meat will cause the worm wheel 28 to drive the hook again as soon as the meat is suspended therefrom. In this construction a collar 55 is secured to the top of the shaft 29 by means of a pin 56. The worm wheel has a socket 57 in its upper face and a pin 58 extends downwardly from the collar 55. A spring 59 surrounds the shaft 29 and normally urges the shaft 29 upwardly so that the pin 58 is out of engagement with the socket 57. It will thus be seen that when it is desired to hang a piece of meat on this hook, the hook may be grasped by the end and held with its open end at the front until the eye in the spear has been hooked on. When the weight of the meat acts on the hook, the spring 59 will be compressed and the pin 58 will enter the socket 57 so that the hook will be positively driven as are all the rest of the hooks. When the meat is removed from the hook then the spring 59 will again raise the hook 26 so that the latter will no longer be positively driven.

Among the many advantages resulting from use of my improved device it will be especially pointed out that a plurality of pieces of meat may be barbecued simultaneously or independently on my improved spit without in any way interfering with each other. The construction thereof further lends itself to making the fireplace ornamental and still permits the grease to be saved. The fireplace may be replenished without in any way making it likely to dirty the meat being barbecued. The drive of the device is readily accessible for inspection or repair and still does not interfere with the ornamental appearance of the fireplace. The spears used may be thoroughly cleansed and it should be noted that they are chromium plated whereby they do not taint the meat being barbecued. Removal and placing of the meat for barbecuing is relatively simple. The device is further so constructed that it may be adapted for driving practically any desired number of spears.

Some changes may be made in the arrangement and construction of the various parts of my improved device without departing from the spirit of my invention and it is my intention to cover by my claims such changes as may reasonably be included within the scope thereof.

I claim as my invention:

1. In a device of the character described, a fireplace, an upwardly opening channel adapted to be disposed horizontally above and in front of said fireplace, a shaft extended through said channel and journaled therein, a collar fixed to said shaft, a worm wheel rotatably mounted on said shaft, a spring extended between said collar and said worm, and co-acting locking means associated with said collar and worm whereby movement of the shaft in one direction will lock said means together and the spring will normally yieldingly urge said means out of engagement.

2. In a device of the character described, a fireplace, a supporting member disposed horizontally above and in front of said fireplace, a vertical shaft extending through said channel and journaled therein, a collar fixed to said shaft, a worm wheel rotatably mounted on said shaft, a spring extended between said collar and said worm, and coacting locking means associated with said collar and worm whereby movement of the shaft in one direction will lock said means together and the spring will normally yieldingly urge said means out of engagement.

3. In a device of the character described, a fireplace having a supporting member disposed above and in front thereof, a vertical shaft slidably and rotatably mounted in said member so as to support a piece of meat in front of said fireplace, a driving member rotatably mounted in said supporting member, an operable clutch mechanism disposed between said shaft and driving member whereby the weight of said meat will engage said clutch, and a spring urging said clutch mechanism out of engagement, when said weight is released.

4. In a device of the character described, a fireplace having a supporting member disposed above and in front thereof, a vertical shaft slidably and rotatably mounted in said member so as to support a piece of meat in front of said fireplace, a driving member rotatably mounted in said supporting member and an operable clutch mechanism disposed between said shaft and driving member whereby the weight of said meat will engage said clutch to thereby rotate the meat in front of the fireplace.

5. In a device of the character described, a longitudinal gear housing disposed above and spaced from the front of the fireplace, a vertical shaft slidably and rotatably mounted in said housing so as to support a piece of meat in front of said fireplace, a driving gear rotatably mounted in said housing aligned with said shaft, and an operable clutch mechanism disposed between said shaft and gear whereby the weight of said piece of meat will engage said clutch to thereby rotate the meat in front of the fireplace.

ROY HEDGE.